(12) United States Patent
Pfeifer et al.

(10) Patent No.: US 8,413,109 B2
(45) Date of Patent: Apr. 2, 2013

(54) SYSTEMS AND METHODS FOR METAMODEL TRANSFORMATION

(75) Inventors: Wolfgang Pfeifer, Kerzenheim (DE); Reinhold Kautzleben, Karlsruhe (DE); Gerrit Simon Kazmaier, Metzingen (DE); Baré Said, Saint Leon-Rot (DE); Gregor Karl Frey, Lorsch (DE)

(73) Assignee: SAP AG, Walldorf (DE)

( * ) Notice: Subject to any disclaimer, the term of this patent is extended or adjusted under 35 U.S.C. 154(b) by 572 days.

(21) Appl. No.: 12/690,511

(22) Filed: Jan. 20, 2010

(65) Prior Publication Data

US 2011/0179397 A1   Jul. 21, 2011

(51) Int. Cl.
*G06F 9/44* (2006.01)

(52) U.S. Cl. ........ 717/104; 717/106; 719/316; 719/329; 719/330

(58) Field of Classification Search .......... 717/101–114, 717/156–165; 719/316, 319, 329, 330
See application file for complete search history.

(56) References Cited

U.S. PATENT DOCUMENTS

| | | | |
|---|---|---|---|
| 6,292,932 B1 * | 9/2001 | Baisley et al. | 717/114 |
| 7,559,066 B2 * | 7/2009 | Ho et al. | 719/330 |
| 7,673,283 B2 * | 3/2010 | Gutz et al. | 717/104 |
| 2005/0022171 A1 * | 1/2005 | Langkafel et al. | 717/136 |
| 2010/0161682 A1 * | 6/2010 | Pfeifer et al. | 707/803 |
| 2011/0131546 A1 * | 6/2011 | Elaasar | 717/105 |

FOREIGN PATENT DOCUMENTS

CN            101354759        *  1/2009

OTHER PUBLICATIONS

Sendall, S.; Kozaczynski, W., "Model transformation: the heart and soul of model-driven software development," Software, IEEE, 2003, vol. 20, No. 5, pp. 42-45.*
Czarnecki et al., Classification of Model Transformation Approaches, OOOPSLA, 2003 Workshop on Generative Techniques in the Context of Model-Driven Architecture, pp. 1-17.*
Jouault et al., ATL: A model transformation tool, 2008 Elsevier B.V. All rights reserved, pp. 31-39.*

* cited by examiner

*Primary Examiner* — Wei Zhen
*Assistant Examiner* — Satish Rampuria
(74) *Attorney, Agent, or Firm* — Buckley, Maschoff & Talwalkar LLC

(57) ABSTRACT

Some aspects relate to systems and methods to receive a first metamodel conforming to a first meta-metamodel associated with first modeling unit types. A second metamodel conforming to a second meta-metamodel is generated based on the first metamodel and on a mapping between the first meta-metamodel and the second meta-metamodel, where the second meta-metamodel is associated with second modeling unit types, and where the first modeling unit types are different from the second modeling unit types.

21 Claims, 8 Drawing Sheets

400

| First Meta-metamodel | Second Meta-metamodel |
| --- | --- |
| Node | Class |
| Node Element | Attribute |
| Action/Query | Operation |
| Association | Association |
| MetaObject | Packet |

*FIG. 4*

SYSTEMS AND METHODS FOR METAMODEL TRANSFORMATION

FIELD

Some embodiments relate to the use of object models within an application platform. More specifically, some embodiments relate to the transformation of a first metamodel conforming to a first meta-metamodel of a first application platform to a second metamodel, where the second metamodel conforms to a second meta-metamodel supported by a second application platform.

BACKGROUND

According to conventional business software terminology, a business object is an object model representing real-world items used during the transaction of business. For example, a business object may represent a business document such as a sales order, a purchase order, or an invoice. A business object may also represent items such as a product, a business partner, or a piece of equipment. Particular documents (e.g., SalesOrder SO435539) and/or items (e.g., ACME corporation) are represented by instances of their representing business object, or business object instances.

A business process platform, such as the Application Platform provided by SAP of Walldorf, Germany, provides application programming interfaces for read and write access to business object instances. Notably, each specific business object (i.e., object model) conforms to a same metadata model (or, "metamodel"). As a result, a business process platform may employ similar application programming interfaces, services, and persistencies to support all instances of each specific business object.

As described in commonly-assigned, co-pending U.S. application Ser. No. 12/339,339, a business process platform may include other metamodels describing technical entities such as, but not limited to, a Web Service, a view, a floorplan (i.e., a user interface layout), a work center, UI texts, and process components. Each metamodel, including the business object metamodel, may in turn conform to a same metametamodel. More specifically, each metamodel may comprise an instance of a same meta-metadata model.

Some application development tools (e.g., Eclipse-based tools) operate based on specific metamodels (e.g., Eclipse Modeling Framework (EMF) models). These metamodels are also instances of a specific meta-metamodel (e.g., eCore). As such, these tools are unable to utilize metamodels which conform to different meta-metamodels. In some cases, the native meta-metamodel (e.g., eCore) of a development tool exposes the same modeling unit types as another meta-metamodel (e.g., UML). Accordingly, desired metamodels of the other meta-metamodel may be directly mapped to metamodels of the native meta-metamodel for use by the development tool.

The foregoing approach is unsuitable in a case that the meta-metamodel of the desired metamodels does not expose the same modeling unit types as the native meta-metamodel of a development tool.

BRIEF DESCRIPTION OF THE DRAWINGS

FIG. 4 illustrates a mapping between modeling unit types according to some embodiments.

DETAILED DESCRIPTION

Figure 1:
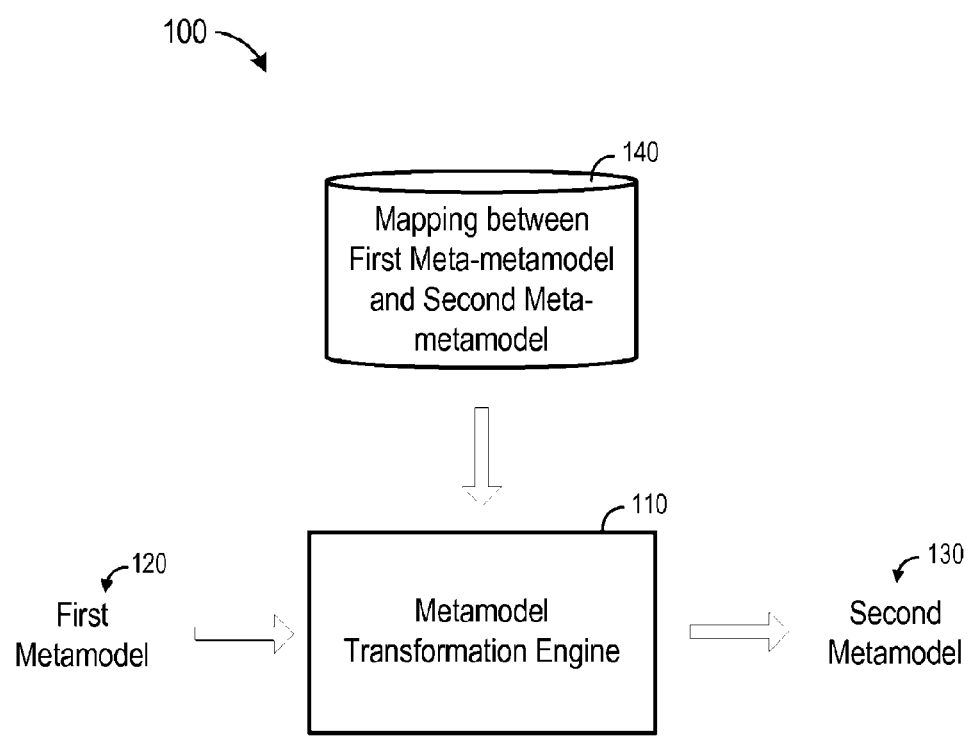
FIG. 1 is a block diagram of a system according to some embodiments.

FIG. 1 is a diagram of system 100 according to some embodiments. System 100 includes metamodel transformation engine 110 for transforming first metamodel 120 to second metamodel 130. More specifically, metamodel transformation engine 110 may receive first metamodel 120 and may generate second metamodel 130 based on a mapping stored in data store 140. The mapping comprises a mapping between a first meta-metamodel of first metamodel 120 and a second meta-metamodel of second metamodel 130.

First metamodel 120 is an instance of the first meta-metamodel and second metamodel 130 is an instance of the second meta-metamodel. Moreover, the first meta-metamodel is associated with first modeling unit types and the second meta-metamodel is associated with second modeling unit types which are different from the first modeling unit types. For example, in some embodiments, the first meta-metamodel is the SAP APM3 meta-metamodel and the second meta-metamodel is the eCore meta-metamodel.

The elements of system 100 may be embodied using any combination of hardware and/or software that is or becomes known. For example, metamodel transformation engine 110 may comprise a general-purpose computer processor executing program code stored on a tangible medium to provide the functions described herein. Moreover, data store 140 may comprise a database storing data and/or executable program code for facilitating the above-described transformation.

Figure 2:
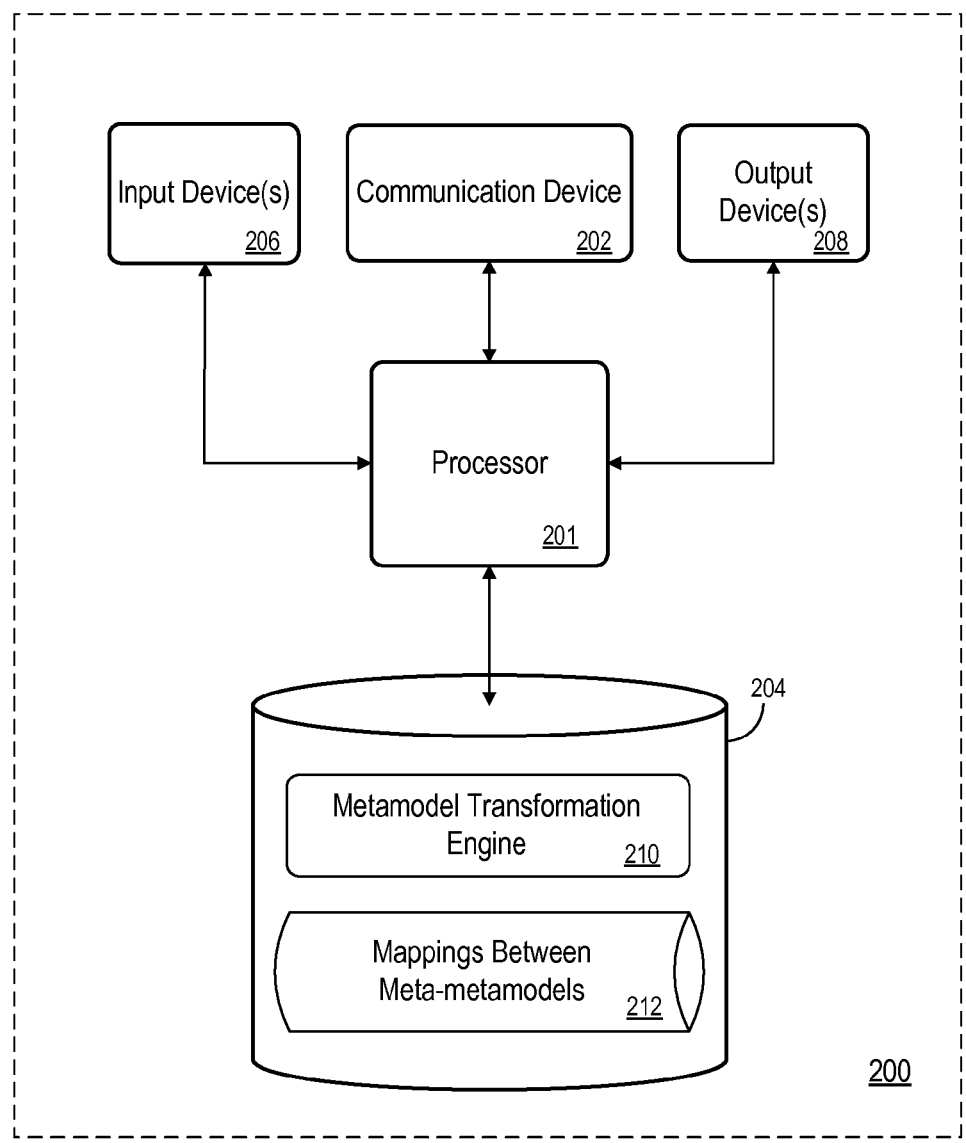
FIG. 2 is a block diagram of an apparatus according to some embodiments.

FIG. 2 is a block diagram of apparatus 200 according to some embodiments. Apparatus 200 may comprise a general-purpose computer system and may perform the functions attributed above to metamodel transformation engine 210. Apparatus 200 includes processor 201 operatively coupled to communication device 202, data storage device 204, one or more input devices 206 and one or more output devices 208. Communication device 202 may facilitate communication with external devices. Input device(s) 206 may comprise, for example, a keyboard, a keypad, a mouse or other pointing device, a microphone, knob or a switch, an infra-red (IR) port, a docking station, and/or a touch screen. Input device(s) 206 may be used, for example, to enter information into apparatus 200. Output device(s) 208 may comprise, for example, a display (e.g., a display screen) a speaker, and/or a printer.

Data storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Data storage device 204 stores program code for execution by processor 200. Metamodel transformation engine 210 may comprise a set of such code, and may be executed by processor 201 to cause system 200 to operate as described above with respect to metamodel transformation engine 110 of FIG.

1. This operation may initially include operation of communication device 202 to receive a first metamodel from an external system.

Data storage device 204 also stores mappings between meta-metamodels 312. Mappings 212 may include mappings between first and second meta-metamodels associated with different modeling unit types as well as mapping between one or more other pairs of meta-metamodels (e.g., between the first meta-metamodel and a third meta-metamodel, between a fourth meta-metamodel and a fifth meta-metamodel). Mappings 212 may comprise any combination of data and/or executable code.

Figure 3:
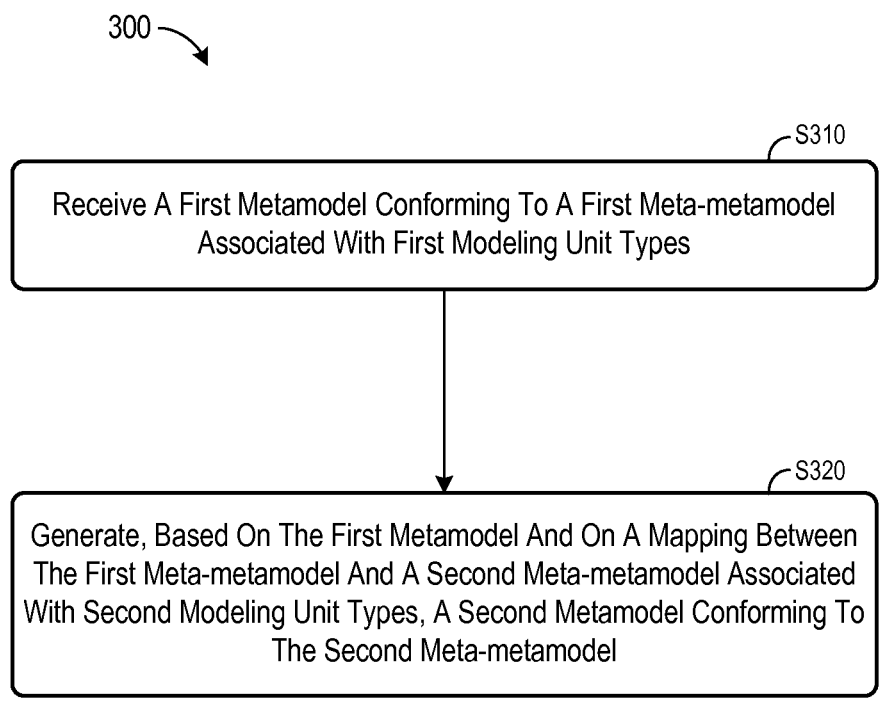
FIG. 3 is a flow diagram of a process according to some embodiments.

FIG. 3 is a flow diagram of process 300 according to some embodiments. Various elements of system 100 and/or apparatus 200 may execute process 300 according to some embodiments. Process 300 may be embodied within program code of metamodel transformation engine 210 of apparatus 200, but embodiments are not limited thereto.

Process 300 and all other processes mentioned herein may be embodied in processor-executable program code read from one or more of a tangible computer-readable medium, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a first metamodel conforming to a first meta-metamodel is received. As described in the Background, the first metamodel may represent a business object or a technical entity such as a Web Service, a view, a floorplan (i.e., a user interface layout), a work center, UI texts, and a process component. Process 300 may be initiated to facilitate usage of the first metamodel within an application development tool.

The first meta-metamodel of the first metamodel is associated with first modeling unit types. Table 400 of FIG. 4 lists modeling unit types (i.e., Node, Node Element, Action/Query, Association, Business Object) of a first meta-metamodel according to some examples. Continuing with the above example, the first meta-metamodel represented in FIG. 4 may be the SAP APM3 meta-metamodel.

Figure 5:
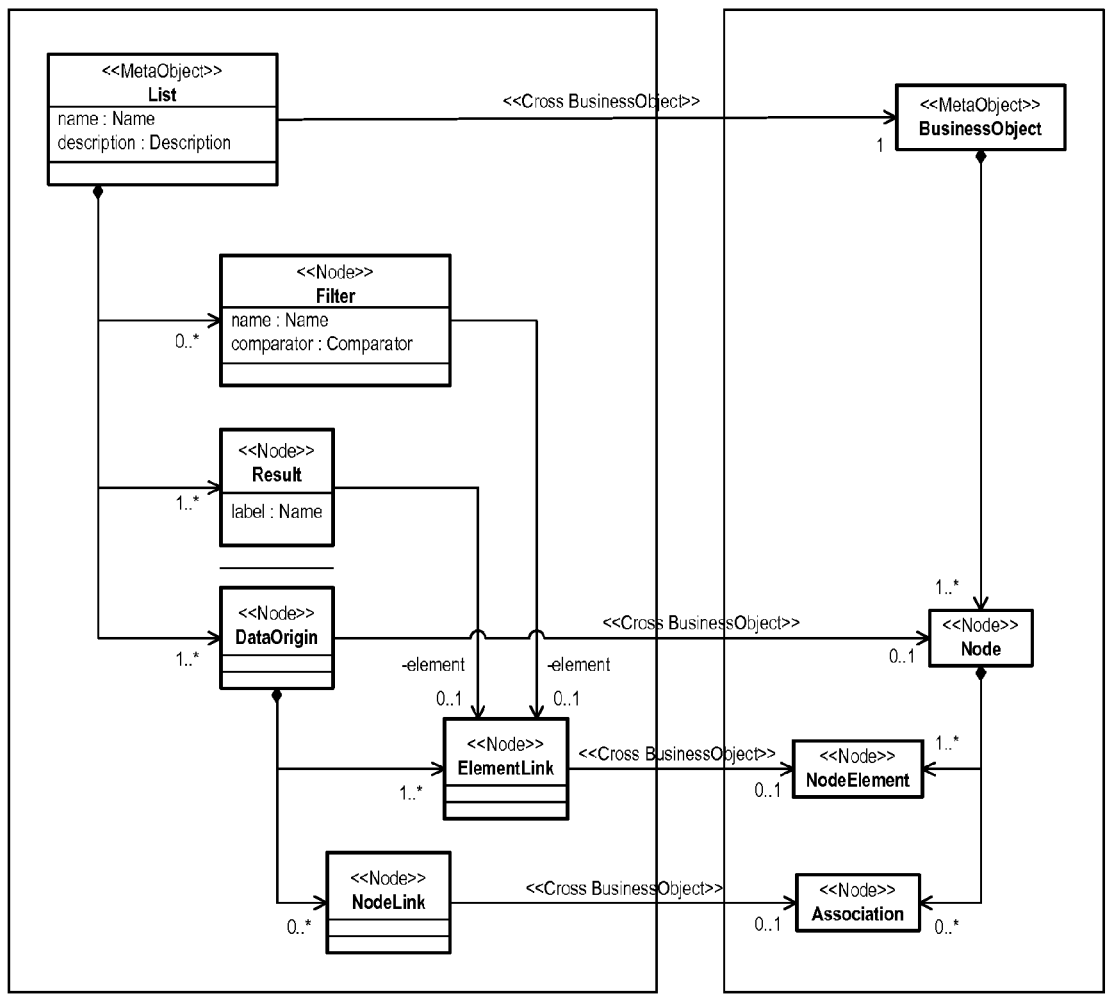
FIG. 5 is a diagram of a metamodel of a first meta-metamodel according to some embodiments.

FIG. 5 illustrates a first metamodel according to an example of process 300. Metamodel 500 represents a list report and consists of the modeling unit types shown in table 400.

Next, at S320, a second metamodel conforming to a second meta-metamodel is generated. The second metamodel is generated based on the first metamodel and on a mapping between the first meta-metamodel and the second meta-metamodel. The second meta-metamodel is associated with second modeling unit types which are different from the first modeling unit types.

Table 400 illustrates lists modeling unit types (i.e., Class, Attribute, Operation, Association, Packet) of a second meta-metamodel according to some examples. The second meta-metamodel represented in FIG. 4 may be the eCore meta-metamodel.

Table 400 also represents a mapping between the modeling unit types of the first and second meta-metamodels. Generally, mapping rules specify how to generate instances of the class modeling unit type based on instances of the node modeling unit type of the first metamodel, to generate instances of the attribute modeling unit type based on instances of the node element modeling unit type of the first metamodel, etc.

For example, and according to some embodiments of S320, each MetaObject representing the first metamodel is mapped to a package representing a second metamodel. The MetaObject name is converted to lower case to generate the package name. The namespace prefix of the package is the same as the package name. The MetaObject namespace (e.g., "http://sap.com/xi/Metamodel") is concatenated with the name of the MetaObject namespace Uniform Resource Indicator to generate the namespace Uniform Resource Indicator of the package.

In a particular example, the first metamodel is represented by the MetaObject ProcessComponent. Accordingly, a package name, namespace prefix, and namespace Uniform Resource Indicator are generated at S320 as processcomponent, processcomponent, and http://sap.com/xi/Metamodel/ProcessComponent http://sap.com/xi/Metamodel/Process-Component, respectively. Each package resides in an eCore file which is named based on the name of the package, (e.g., processcomponent.ecore). An EMF genmodel is also generated for each package to include metadata for code generation associated with the second metamodel.

The package includes a class representing each node of the first metamodel. Except for the class representing the root node, a class name is identical to the name of the node it represents. The class name representing the root node shares the name of the MetaObject (e.g. ProcessComponent). In the case of the eCore meta-metamodel, a data type that defines the node structure is not needed.

Node elements of the first metamodel which are not associated with complex types are mapped to attributes of the second metamodel. According to some embodiments, the specified attribute properties include: Changeable (false if node element is read-only); EType (EBoolean for indicators, EString otherwise, EInt, constraints (e.g., restricted length)); Name (i.e., node element name); Lower Bound (i.e., according to cardinality); and Upper Bound ((i.e., according to cardinality).

A node element associated with a complex data type is mapped to a reference and a class that represents the complex data type. Continuing with the present example, the following reference properties are specified: Changeable (false if node element is read-only); Containment (always true); EType (i.e., name of the class that represents the complex type); Name (i.e., node element name); Lower Bound (i.e., according to cardinality); and Upper Bound (i.e., according to cardinality).

The name of the second metamodel class (i.e., representing the complex type) is determined by the data type name. The classes representing complex types reside either in a metamodel package (e.g., namespace http://sap.com/xi/Metamodel") or in a global package (e.g., namespace "http://sap.com/xi/BASIS/Global").

As further shown in table 400, associations of the first metamodel may be mapped to references of the second metamodel. The references are uni-directional and are located at the class representing the source node. The following reference properties may be specified: Changeable (false if node association is read-only); Containment (true for composite-associations, false otherwise); EType (i.e., name of the class that represents the target node); Name (i.e., association name at the source node); Lower Bound (i.e., according to cardinality); and Upper Bound (i.e., according to cardinality).

Figure 6:
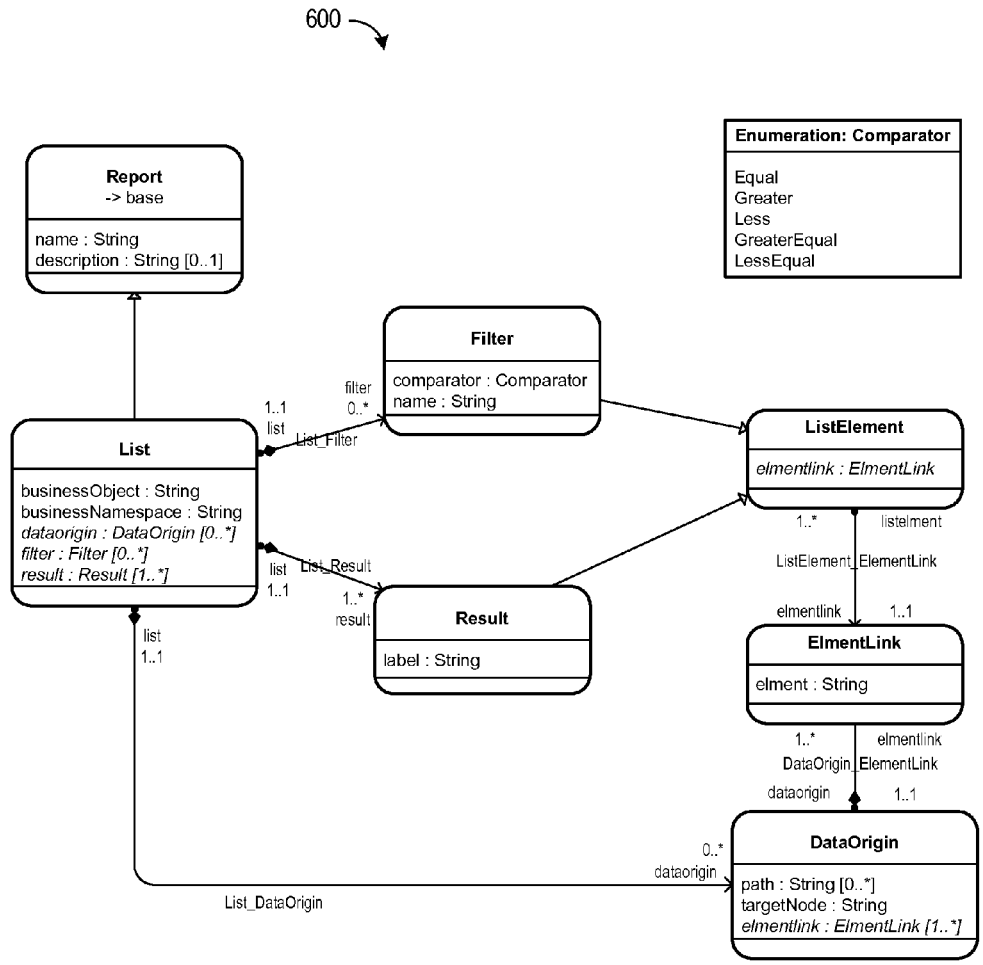
FIG. 6 is a diagram of a metamodel of a second metametamodel according to some embodiments.

FIG. 6 illustrates metamodel 600 generated at S320 according to the present example. In other words, metamodel 600 was generated based on metamodel 500 and on the FIG. 4 mapping. Metamodel 600 therefore conforms to the second meta-metamodel of table 400 and includes the second modeling unit types listed therein. Metamodel 600 may be used by an application development tool in which the second meta-metamodel is native.

Figure 7:
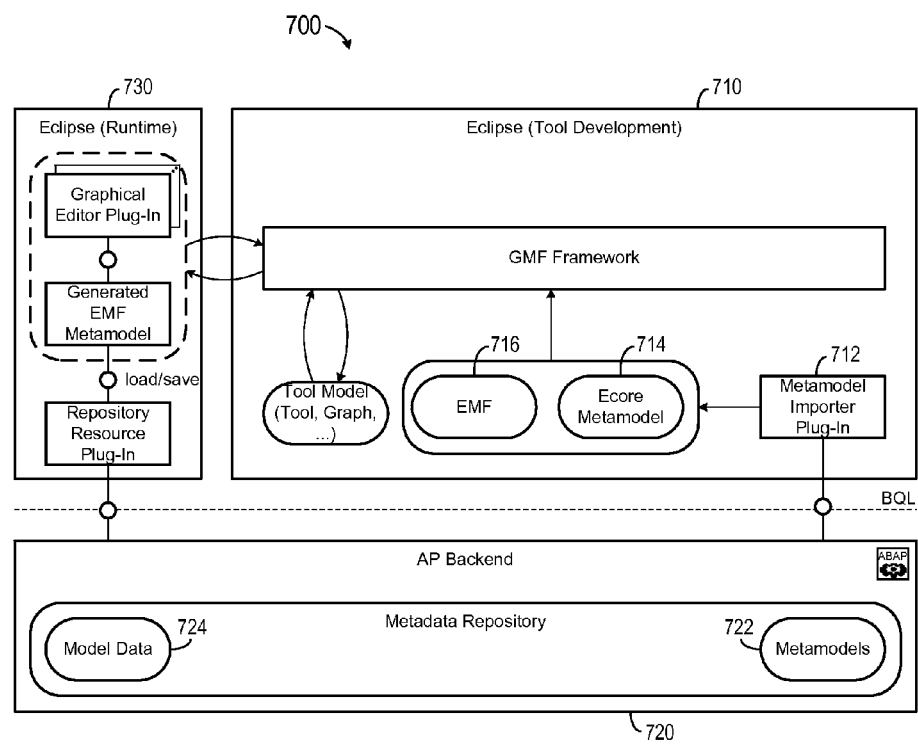
FIG. 7 is a block diagram of an architecture using metamodel transformation according to some embodiments.

FIG. 7 is a block diagram of system 700 according to some embodiments. System 700 may implement system 100, apparatus 200, and/or process 300 to transform a first metamodel of a first meta-metamodel to a second metamodel of a second meta-metamodel as described herein.

More specifically, tool development environment 710 is used to develop business tools/applications based on metamodels of a native meta-metamodel, which will be referred to as the second meta-metamodel. Environment 710 may access AP backend 720 to retrieve metamodels 722 therefrom. Metamodels 722 conform to a first meta-metamodel associated with modeling unit types which are different from the modeling unit types of the second meta-metamodel. Accordingly, tool development environment 710 is unable to use metamodels 722 in their stored format.

Metamodel importer plug-in 712 of environment 710 may therefore implement system 100, apparatus 200 and/or process 300 to transform a first metamodel of metamodels 725 to a second metamodel of the second meta-metamodel. According to some embodiments, the transformation results in eCore metamodel file 714 and EMF genmodel file 716, the contents of which are known in the art.

Figure 8:
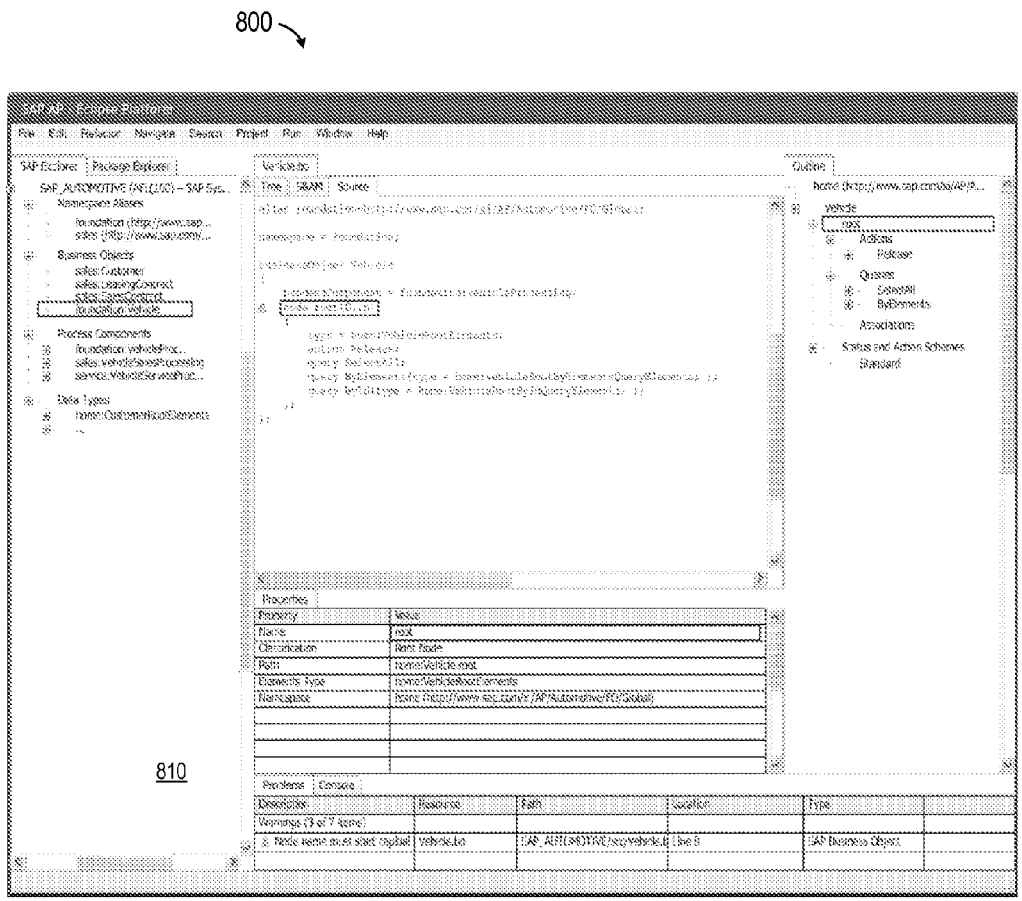
FIG. 8 illustrates a user interface presenting a transformed metamodel according to some embodiments.

Environment 710 may then access and utilize the resulting eCore metamodel file 714 and EMF genmodel file 716 using native processes. For example, FIG. 8 is a outward view of user interface 800 provided by environment 710 according to some embodiments. A developer may manipulate user interface 800 to access metamodels 722 and develop tools based thereon.

For example, pane 810 of interface 800 allows a developer to select from native metamodels (i.e., Package Explorer) and non-native metamodels of a non-native meta-metamodel (i.e., SAP Explorer). Upon selection of a non-native metamodel, the remaining areas of interface 800 present a second metamodel which conforms to the native meta-metamodel, and which has been generated as described above based on the selected non-native metamodel and on a mapping between the non-native meta-metamodel and the native meta-metamodel.

During runtime of a tool developed using such a generated metamodel, runtime component 730 may access model data 724 of AP backend 720 which corresponds to the selected non-native metamodel.

The above-described block diagrams illustrate logical architectures for describing some embodiments, and actual implementations may include more or different components arranged in any manner. Each device and method described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

The embodiments described herein are solely for the purpose of illustration. Those in the art will recognize other embodiments may be practiced with modifications and alterations limited only by the claims.

What is claimed is:

1. A computer-implemented method comprising:
receiving a first metamodel conforming to a first meta-metamodel associated with first modeling unit types; and
generating, based on the first metamodel and on a mapping between the first meta-metamodel and a second meta-metamodel associated with second modeling unit types, a second metamodel conforming to the second meta-metamodel,
wherein the first modeling unit types are different from the second modeling unit types;
after the generating of the second metamodel based on the first metamodel and the mapping, using the second metamodel conforming to the second meta-metamodel to develop a tool that is based on the first metamodel conforming to the first meta-metamodel; and
after the using of the second metamodel conforming to the second meta-metamodel to develop a tool that is based on the first metamodel conforming to the first meta-metamodel, using the tool developed using the second metamodel to access model data conforming to the first meta-metamodel.

2. The method according to claim 1, wherein the mapping comprises a plurality of rules to generate instances of each of the second modeling unit types based on instances of respective ones of the first modeling unit types.

3. The method according to claim 1, wherein generating the second metamodel comprises:
generating, for each node of the first metamodel, a respective class of the second metamodel.

4. The method according to claim 3, wherein generating the second metamodel comprises:
determining whether a node element of the first metamodel is associated with a complex type;
if the node element of the first metamodel is not associated with a complex type, generating an attribute of the second metamodel representing the node element of the first metamodel; and
if the node element of the first metamodel is associated with a complex type, generating a reference and a second class of the second metamodel representing the node element, where the second class represents the complex data type.

5. The method according to claim 4, wherein generating the second metamodel comprises:
generating, for each association of the first metamodel, a respective reference of the second metamodel.

6. A system comprising:
a metamodel transformation engine that includes hardware and is to:
receive a first metamodel conforming to a first meta-metamodel associated with first modeling unit types; and
generate, based on the first metamodel and on a mapping between the first meta-metamodel and a second meta-metamodel associated with second modeling unit types, a second metamodel conforming to the second meta-metamodel,
wherein the first modeling unit types are different from the second modeling unit types;
the metamodel transformation engine further to:
after the generate the second metamodel based on the first metamodel and the mapping, use the second metamodel conforming to the second meta-metamodel to develop a tool that is based on the first metamodel conforming to the first meta-metamodel; and after the use the second metamodel conforming to the second meta-metamodel to develop a tool that is based on the first metamodel conforming to the first meta-metamodel, use the tool developed using the second metamodel to access model data conforming to the first meta-metamodel.

7. The system according to claim 6, wherein the mapping comprises a plurality of rules to generate instances of each of the second modeling unit types based on instances of respective ones of the first modeling unit types.

8. The system according to claim 6, wherein generation of the second metamodel comprises:

generation, for each node of the first metamodel, of a respective class of the second metamodel.

9. The system according to claim 8, wherein generation of the second metamodel comprises:

determination of whether a node element of the first metamodel is associated with a complex type;

if the node element of the first metamodel is not associated with a complex type, generation of an attribute of the second metamodel representing the node element of the first metamodel; and if the node element of the first metamodel is associated with a complex type, generation of a reference and a second class of the second metamodel representing the node element, where the second class represents the complex data type.

10. The system according to claim 9, wherein generation of the second metamodel comprises:

generation, for each association of the first metamodel, of a respective reference of the second metamodel.

11. A non-transitory computer-readable medium storing program code executable by a computer to:

receive a first metamodel conforming to a first meta-metamodel associated with first modeling unit types; and generate, based on the first metamodel and on a mapping between the first meta-metamodel and a second meta-metamodel associated with second modeling unit types, a second metamodel conforming to the second meta-metamodel, wherein the first modeling unit types are different from the second modeling unit types;

the program code further comprising program code executable by the computer to:

after the generate the second metamodel based on the first metamodel and the mapping, use the second metamodel conforming to the second meta-metamodel to develop a tool that is based on the first metamodel conforming to the first meta-metamodel; and after the use the second metamodel conforming to the second meta-metamodel to develop a tool that is based on the first metamodel conforming to the first meta-metamodel, use the tool developed using the second metamodel to access model data conforming to the first meta-metamodel.

12. The medium according to claim 11, wherein the mapping comprises a plurality of rules to generate instances of each of the second modeling unit types based on instances of respective ones of the first modeling unit types.

13. The medium according to claim 11, wherein the program code executable by the computer to generate the second metamodel comprises program code executable by the computer to:

generate for each node of the first metamodel, a respective class of the second metamodel.

14. The medium according to claim 13, wherein the program code executable by the computer to generate the second metamodel comprises program code executable by the computer to:

determine whether a node element of the first metamodel is associated with a complex type;

if the node element of the first metamodel is not associated with a complex type, generate an attribute of the second metamodel representing the node element of the first metamodel; and if the node element of the first metamodel is associated with a complex type, generate a reference and a second class of the second metamodel representing the node element, where the second class represents the complex data type.

15. The medium according to claim 14, wherein the program code executable by the computer to generate the second metamodel comprises program code executable by the computer to:

generate, for each association of the first metamodel, a respective reference of the second metamodel.

16. The method according to claim 1, wherein the generating of the second metamodel based on the first metamodel and the mapping results in an eCore metamodel file and an EMF genmodel file.

17. The method according to claim 16, wherein the using the second metamodel conforming to the second meta-metamodel to develop a tool that is based on the first metamodel conforming to the first meta-metamodel comprises:

using the eCore metamodel file and the EMF genmodel file that are generated based on the first metamodel and on the mapping to develop a tool that is based on the first metamodel conforming to the first meta-metamodel; and wherein the using the tool developed using the second metamodel to access model data conforming to the first meta-metamodel comprises:

using the tool developed using the eCore metamodel file and the EMF genmodel file to access model data conforming to the first meta-metamodel.

18. The system according to claim 6, wherein the generate the second metamodel based on the first metamodel and the mapping results in an eCore metamodel file and an EMF genmodel file results in an eCore metamodel file and an EMF genmodel file.

19. The system according to claim 18, wherein the use the second metamodel conforming to the second meta-metamodel to develop a tool that is based on the first metamodel conforming to the first meta-metamodel comprises:

use the eCore metamodel file and the EMF genmodel file that are generated based on the first metamodel and on the mapping to develop a tool that is based on the first metamodel conforming to the first meta-metamodel; and wherein the use the tool developed using the second metamodel to access model data conforming to the first meta-metamodel comprises:

use the tool developed using the eCore metamodel file and the EMF genmodel file to access model data conforming to the first meta-metamodel.

20. The medium according to claim 11, wherein the generate the second metamodel based on the first metamodel and the mapping results in an eCore metamodel file and an EMF genmodel file results in an eCore metamodel file and an EMF genmodel file.

21. The medium according to claim 20, wherein the use the second metamodel conforming to the second meta-metamodel to develop a tool that is based on the first metamodel conforming to the first meta-metamodel comprises:

use the eCore metamodel file and the EMF genmodel file that are generated based on the first metamodel and on the mapping to develop a tool that is based on the first metamodel conforming to the first meta-metamodel; and wherein the use the tool developed using the second metamodel to access model data conforming to the first meta-metamodel comprises:

use the tool developed using the eCore metamodel file and the EMF genmodel file to access model data conforming to the first meta-metamodel.

\* \* \* \* \*